United States Patent
Bode et al.

(10) Patent No.: US 11,140,001 B2
(45) Date of Patent: Oct. 5, 2021

(54) METHOD FOR PROVIDING DATA PACKETS FROM A CAN BUS, CONTROL DEVICE AND SYSTEM HAVING A CAN BUS

(71) Applicant: SIEMENS AKTIENGESELLSCHAFT, Munich (DE)

(72) Inventors: Sebastian Bode, Ahlen (DE); Matthias Kovatsch, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/648,944

(22) PCT Filed: Sep. 21, 2018

(86) PCT No.: PCT/EP2018/075598
§ 371 (c)(1),
(2) Date: Mar. 19, 2020

(87) PCT Pub. No.: WO2019/057889
PCT Pub. Date: Mar. 28, 2019

(65) Prior Publication Data
US 2020/0252235 A1 Aug. 6, 2020

(30) Foreign Application Priority Data
Sep. 22, 2017 (DE) ............ 10 2017 216 833.1

(51) Int. Cl.
*H04L 12/40* (2006.01)
*H04L 12/54* (2013.01)
(Continued)

(52) U.S. Cl.
CPC ........ *H04L 12/40013* (2013.01); *B60L 53/66* (2019.02); *H04L 12/56* (2013.01);
(Continued)

(58) Field of Classification Search
CPC ... H04L 12/40013; H04L 12/56; H04L 67/02; H04L 67/12; H04L 2012/40215;
(Continued)

(56) References Cited

U.S. PATENT DOCUMENTS 5,732,074 A 3/1998 Spaur
6,654,355 B1 * 11/2003 Marbach ............ H04L 12/4135
370/285
(Continued)

FOREIGN PATENT DOCUMENTS

CN 2733452 Y 10/2005
CN 103780697 A 5/2014
(Continued)

OTHER PUBLICATIONS

Russian Decision to Grant for Russian Application No. 2420-561901RU/3204 dated Aug. 25, 2020.
(Continued)

*Primary Examiner* — Idriss N Alrobaye
*Assistant Examiner* — Henry W Yu
(74) *Attorney, Agent, or Firm* — Lempia Summerfield Katz LLC

(57) ABSTRACT

The invention relates to a method for providing data packets (5) from a CAN bus (2), in particular a charging station for a motor vehicle. In order to permit a resource-saving and nevertheless secure possible way of providing data packets (5), steps are provided: detection of the data packets (5) from at least one component (3) of the CAN bus (2) by a detection unit (10) which is part of the CAN bus (3), creation of at least one web resource (6) which contains the data packets (5) in accordance with a predetermined specification by a computing unit (11), wherein only data packets (5) which are related in accordance with the predetermined specification are combined in the at least one web resource (6), transmis-
(Continued)

sion of a content of the at least one web resource (6) from the computing unit (11) to a receiving device (4) by means of a communication unit (12) via a data link (7) having a transmission protocol that differs from the CAN bus (2).

20 Claims, 2 Drawing Sheets

(51) Int. Cl.
*H04L 29/08* (2006.01)
*B60L 53/66* (2019.01)

(52) U.S. Cl.
CPC .............. *H04L 67/02* (2013.01); *H04L 67/12* (2013.01); *H04L 2012/40215* (2013.01)

(58) Field of Classification Search
CPC ...... B60L 53/66; Y02T 90/12; Y02T 10/7072; Y02T 10/70; Y02T 90/16
See application file for complete search history.

(56) References Cited

U.S. PATENT DOCUMENTS

| | | | | |
|---|---|---|---|---|
| 6,728,268 | B1* | 4/2004 | Bird | H04L 29/12009 370/230 |
| 8,185,647 | B2* | 5/2012 | Sodergren | G05B 19/0423 709/230 |
| 9,294,590 | B2* | 3/2016 | Hwang | H04L 12/4625 |
| 10,142,358 | B1* | 11/2018 | Bajpai | H04L 43/028 |
| 2008/0186870 | A1* | 8/2008 | Butts | H04L 43/0847 370/252 |
| 2009/0309727 | A1 | 12/2009 | Rice | |
| 2011/0218689 | A1* | 9/2011 | Chan | G06F 1/28 700/295 |
| 2014/0040959 | A1 | 2/2014 | Oyman | |
| 2014/0129047 | A1* | 5/2014 | Barrett | G07C 5/00 701/1 |
| 2016/0330292 | A1 | 11/2016 | Helpingstine | |
| 2019/0253498 | A1 | 8/2019 | Xu | |

FOREIGN PATENT DOCUMENTS

| | | |
|---|---|---|
| CN | 104029602 A | 9/2014 |
| CN | 106230648 A | 12/2016 |
| DE | 102016108189 A1 | 11/2016 |
| EA | 016566 B1 | 5/2012 |
| EP | 1515496 B1 | 3/2007 |
| EP | 2525312 A1 | 11/2012 |
| RU | 2598800 C2 | 9/2016 |
| WO | WO9726750 A1 | 7/1997 |

OTHER PUBLICATIONS

German Office Action for German Application No. 10 2017 216 833.1 dated Aug. 2, 2018.
PCT International Search Report and Written Opinion of International Searching Authority dated Dec. 21, 2028 corresponding to PCT International Application No. PCT/EP2018/075598 filed Sep. 21, 2018.
Chinese Office Action for Chinese Application No. 201880075717.9 dated Jun. 3, 2021.

* cited by examiner

METHOD FOR PROVIDING DATA PACKETS FROM A CAN BUS, CONTROL DEVICE AND SYSTEM HAVING A CAN BUS

RELATED CASE

The present patent document is a § 371 nationalization of PCT Application Serial Number PCT/EP2018/075598, filed Sep. 21, 2018, and also claims the benefit of DE Application Serial No. 10 2017 216 833.1, filed Sep. 22, 2017, which are hereby incorporated by reference.

FIELD

The present embodiments relate to a method for providing data packets from a controller area network (CAN) bus, for example a charging station for a motor vehicle. A second aspect relates to a control device for providing data packets from a CAN bus. A third aspect relates to a system for providing data packets from a CAN bus.

BACKGROUND

A CAN bus is used ever more frequently, including apart from its conventional use in motor vehicles, as a result of increasing networking of technical systems. In this context, the CAN bus can be used for networking individual components or modules within a technical system, and Ethernet or network technologies based thereon for connecting the technical system to the outside, for example to a backend, to the Internet and/or to a server device. The individual components of the technical system are often produced by different manufacturers, in each case for a multiplicity of purposes. It then falls to the manufacturer of the technical system to perform the task of developing, setting up and/or maintaining the technical system using suitable components. An increasing number of technical systems of this kind are operated not on factory premises of an operator of the technical system but rather in a public space. Examples of these are charging stations for motor vehicles that have an electrical energy store, in particular electric vehicles. Accordingly, the installation is maintained preferably over an interface for connecting the technical system to the outside, for example Ethernet or the backend link. In this case, the connection can be made via public networks, in particular the Internet.

Operation and maintenance of the technical system are therefore faced with the challenge of allowing remote access to the CAN bus. In this case, it is necessary to ensure that the different parties involved, for example component manufacturers of the components, manufacturers of the technical system, operators of the technical system and/or users of the technical system, are provided with access to specific data and/or components of the technical system without this also being possible for other, unauthorized, participants. The CAN bus is designed purely for local networking within the technical system. In other words, the CAN bus networks the individual components of the technical system. The CAN bus is a bus that allows any party involved to receive any message or any sent data packet. By contrast, the interface for the backend link has solutions for delivering data only to authorized parties involved.

An example of a technical system of this kind is a charging station for a motor vehicle, in particular an electric vehicle, wherein the charging station consists of numerous components, for example converter, operator control unit, communication unit for communicating with the motor vehicle and an energy meter, and the energy meter. Each of said components can again be made up of multiple subcomponents. Charging stations are used by users or drivers of electric vehicles. The charging station is operated by an owner of a freeway service area, for example. Power delivered by the charging unit is billed for by a mobile service provider, for example, which invoices the delivered power to the user or driver of the electric vehicle. The delivered power can additionally be delivered and billed for via a local energy supplier. The charging station can be maintained via a manufacturer of the charging station. The analysis of the individual components of the charging station is relevant to a manufacturer of individual components, for example. In other words, there are a multiplicity of different parties involved for which respective different information relating to the charging station needs to be relevant and retrievable.

It is known practice from the prior art to connect directly to the CAN bus. However, this requires physical access to the CAN bus and hence also to the whole technical system. Technical systems in the public space, such as for example the charging station, can require an engineer to visit. Limiting the access to specific data packets from the CAN bus is not possible in this case.

Alternatively, it is known practice to be provided with access to the CAN bus via a component of the technical system if there is other access to the component. The other access can be by secure shell protocol (SSH) via the Internet, for example. In this way, although remote access to the CAN bus is ensured, the party involved is provided firstly with access to all data packets sent via the CAN bus and secondly with access to the relevant component. Limitation of access rights is not always readily possible in this case. Additionally, the access can be affected by security loopholes, which then relate to the whole technical system.

A third option for accessing the CAN bus is a maintenance interface, or "management interface." The multiplicity of different components of different manufacture in conjunction with different access rights render such an implementation very sophisticated and costly. Moreover, there is the risk of security loopholes in this case too. Furthermore, a comparatively high level of computing power is needed to provide the management interface.

SUMMARY AND DETAILED DESCRIPTION

It is therefore an object of the present embodiments to allow a more resource-saving and nevertheless more secure option for providing data packets from a CAN bus.

One present embodiment provides a method by which the provision of data packets between two totally incompatible data connections is made possible. Direct connection of the CAN bus to the data connection is not possible in this case. The data packets can therefore be collected from the CAN bus and provided in the form of the at least one web resource for conveyance by the data connection.

A first aspect is based on a method for providing data packets from a CAN bus, in particular a charging station for a motor vehicle. In other words, the CAN bus can be part of the charging station. Preferably, the CAN bus is configured to link multiple components or modules of the charging station to one another. The CAN bus can be embodied as per ISO standard 11898, in particular. The method has the following acts:

capturing the data packets from at least one component of the CAN bus by a capture unit (e.g., data capture interface) that is part of the CAN bus, creating a web resource, which contains the data packets, according to a predetermined specification by a computing unit (e.g., processor or computer), wherein only data packets that are related according to the predetermined specification are combined in the at least one web resource, and conveying a content of the at least one web resource from the computing unit to a receiving device via a data connection, using a transmission protocol that is different than the CAN bus, by a communication unit (e.g., interface, communicator, or transmitter).

Capturing the data packets involves them being captured in particular from one or more of the components that are connected to one another by the CAN bus. The capture unit can be connected to the CAN bus in the same manner as the at least one component of the CAN bus. In particular, the at least one component of the CAN bus and the capture unit are connected to one another via the CAN bus. Alternatively, the capture unit can be part of one of the components of the CAN bus. In this case, the data packets can be captured from the component of the CAN bus that includes the capture unit, and/or from at least one further component of the CAN bus. In an actual example, the CAN bus includes multiple components, wherein the data packets are received from each of the plurality of components by the capture unit. In this case, the capture unit can be part of one of the components of the CAN bus.

The capture unit is preferably linked to the computing unit. The computing unit can map all captured data packets or only selected instances of the captured data packets onto the at least one web resource. By way of example, the computing unit creates a web resource in which only such instances of the data packets as correspond to the predetermined specification or are selected according to the predetermined specification are combined. Alternatively, multiple web resources are created, wherein such instances of the data packets as correspond to a respective subspecification of the predetermined specification or are selected according to the respective subspecification are combined in each of the multiple web resources each time. In other words, each of the multiple web resources has one of the respective subspecifications associated with it, the respective subspecification prescribing which of the data packets are combined in the respective web resource.

The web resource within the context of the present embodiments is in particular an object that can be accessed. In particular, the at least one web resource has a unique address, in particular a web address and/or URL (uniform resource locator). Retrieving the address of the at least one web resource allows the web resource or the content thereof to be called or retrieved. According to one embodiment, multiple web resources are created and each of the multiple web resources has a respective, unique address. The content of the at least one web resource is conveyed in particular when the address of the at least one web resource is called by the receiving device. In other words, it is ascertained whether the at least one web resource is called by the receiving device, and, if this is the case, the content of the at least one web resource is conveyed to the receiving device. In other words, the at least one web resource or the content thereof is provided retrievably.

In other words, the solution, according to one embodiment, to the underlying problem provides for the data packets to be mapped onto the at least one web resource and thereby provided retrievably via the data connection. The creating of the web resource and the combining of the data packets in the web resource according to the predetermined specification are possible in a particularly uncomplicated and resource-saving manner. Additionally, programming of the computing unit is possible in a particularly simple manner, since the predetermined specification can easily be used to prescribe which of the data packets are combined in the web resource. When the web resource is provided or when the content of the web resource is retrieved or conveyed, no access to the computing unit and/or CAN bus beyond that is possible, in particular. This allows a high security level to be ensured.

The receiving device is for example a server device, a personal computer, a notebook and/or a mobile terminal, for example a tablet or a smartphone. The communication unit (communicator) can be for example a network module, a modem or a mobile radio.

One development provides for the content of the at least one web resource to be conveyed to the receiving device by an HTTP (Hypertext Transfer Protocol) or a CoAP (Constrained Application Protocol) as the transmission protocol. Said protocols are exemplary protocols by which the web resource or the content can be conveyed particularly advantageously to the receiving device. In particular, the web resource can be provided and conveyed in a particularly resource-saving manner via the CoAP. The data connection can be provided via Ethernet, WLAN, an Internet access, by wire or by mobile radio, for example.

One development provides for the predetermined specification to stipulate that the creating of the at least one web resource results in a content of the data packets being interpreted, and the content is used to ascertain whether the data packets are related. By way of example, the data packets can be examined for predetermined data patterns while being interpreted. In particular, such instances of the data packets as all have a common predetermined data pattern can then be combined in the at least one web resource. In this case, all data packets that contain the common predetermined data pattern can be retrieved by retrieving the at least one web resource.

One development provides for the predetermined specification to be provided at least in part by a program module (software or instructions) that is received from the receiving device. The program module prescribes in particular the criteria according to which the data packets are combined in the at least one web resource. Alternatively or additionally, the program module can prescribe the manner in which the content of the data packets is interpreted. By way of example, the program module can provide the predetermined data pattern from which the data packets are examined. As a result of the program module being received from the receiving device, the providing of the data packets from the CAN bus can be controlled at least in part by the receiving device. The program module is in particular received from the receiving device via the data connection, using the transmission protocol that is different from the CAN bus.

In particular, there is provision for the computing unit to be configured by the receiving of the program module, to interpret the data packets in a manner adapted to the receiving device, to an instance of application and/or to the at least one component of the CAN bus. By way of example, the program module can prescribe that the data packets are provided in a manner that is adapted for different parties involved. Different parties involved can be for example, as already described by way of introduction, manufacturers of components of a technical system that has the CAN bus, manufacturers of the technical system, operators of the technical system or a customer of the technical system. The technical system in this case is in particular the charging station.

One development provides for the content of the at least one web resource to be conveyed to the receiving device without granting the receiving device access to the computing unit and/or the CAN bus beyond that. In other words, there can be provision for access to the CAN bus and/or the computing unit to be made possible only within a context of retrieval or conveyance of the web resource. Additionally, depending on the embodiment, there can be provision for the receiving device to be granted access to the computing unit to the effect that it is possible for the program module to be received from the receiving device. In this way, it is possible to prevent the user of the receiving device from being provided with access to the computing unit and/or the CAN bus. This allows the occurrence of security loopholes when granting access to the computing unit and/or the CAN bus to be effectively prevented. Additionally, it is possible to ensure that only those instances of the data packets that are selected in accordance with the predetermined specification are conveyed to the receiving device.

In particular, the predetermined specification can provide access monitoring for the data packets. Preferably, there is provision for only such data packets as the receiving device has the authorization to receive to be combined in the at least one web resource. In other words, those instances of the data packets that the receiving device does not have authorization to receive are not combined in the web resource. In this way, the predetermined specification can be used to select which of the data packets are transmitted to the receiving device.

In one example, the data packets include a respective identifier. The predetermined specification states that it is then possible for precisely such data packets as have the same identifier to be combined in the at least one web resource. By way of example, data packets having the same identifier are combined in a respective web resource. The identifier can be for example a CAN-ID that is part of each of the data packets. In an actual example, a respective web resource is created for each CAN-ID that occurs in the data packets. Precisely the data packets that have the identifier or the CAN-ID that is associated with the web resource are then combined in each of the web resources.

Alternatively or additionally, the data packets can have a respective information type. By way of example, the information type of the data packets is at least in part that of a ready signal. The predetermined specification stipulates that precisely the data packets that have the same information type can then be combined in the at least one web resource. In an actual example, all data packets that are a ready signal are combined in a web resource. The information type can be ascertained from information that is part of the data packet and/or can be ascertained by interpreting the data packets. When the information type is ascertained by interpretation, the information type can be ascertained from the program module in accordance with rules.

A second aspect relates to a control device (controller or processor) for providing data packets from a CAN bus, in particular a charging station for a motor vehicle. The CAN bus can be standardized by ISO standard 11898. The control device has a capture unit, which is connectable to the CAN bus, for capturing the data packets from at least one component of the CAN bus. Additionally, the control device has a computing unit for creating at least one web resource, which contains the data packets, according to a predetermined specification, wherein only data packets that are related according to the predetermined specification are combined in a respective web resource. Additionally, the control device has a communication unit for conveying a content of the at least one web resource from the computing unit to the receiving device via a data connection, using a transmission protocol that is different than the CAN bus. In other words, the transmission protocol diverges from ISO standard 11898.

A further aspect relates to a system for providing data packets having a control device of the type cited above, and also a CAN bus, which has a component that is configured to convey the data packets to the control device, and having a receiving device for retrieving the web resource from the control device. The CAN bus is in particular part of a charging station for a motor vehicle, preferably an electric vehicle. In particular, the CAN bus connects different modules of the charging station to one another. Advantageous embodiments and expedient developments of the method analogously also develop the system and the control device. For this reason, the features of the control device and of the system that have already been described in conjunction with the method are not cited again here.

BRIEF DESCRIPTION OF THE DRAWINGS

Further features and advantages can be found in the description below with reference to the accompanying figures. In the figures, identical reference signs denote identical features and functions. The exemplary embodiments serve merely to explain the invention and are not intended to restrict it.

In the figures.

DETAILED DESCRIPTION OF THE PREFERRED EMBODIMENTS

Figure 1:
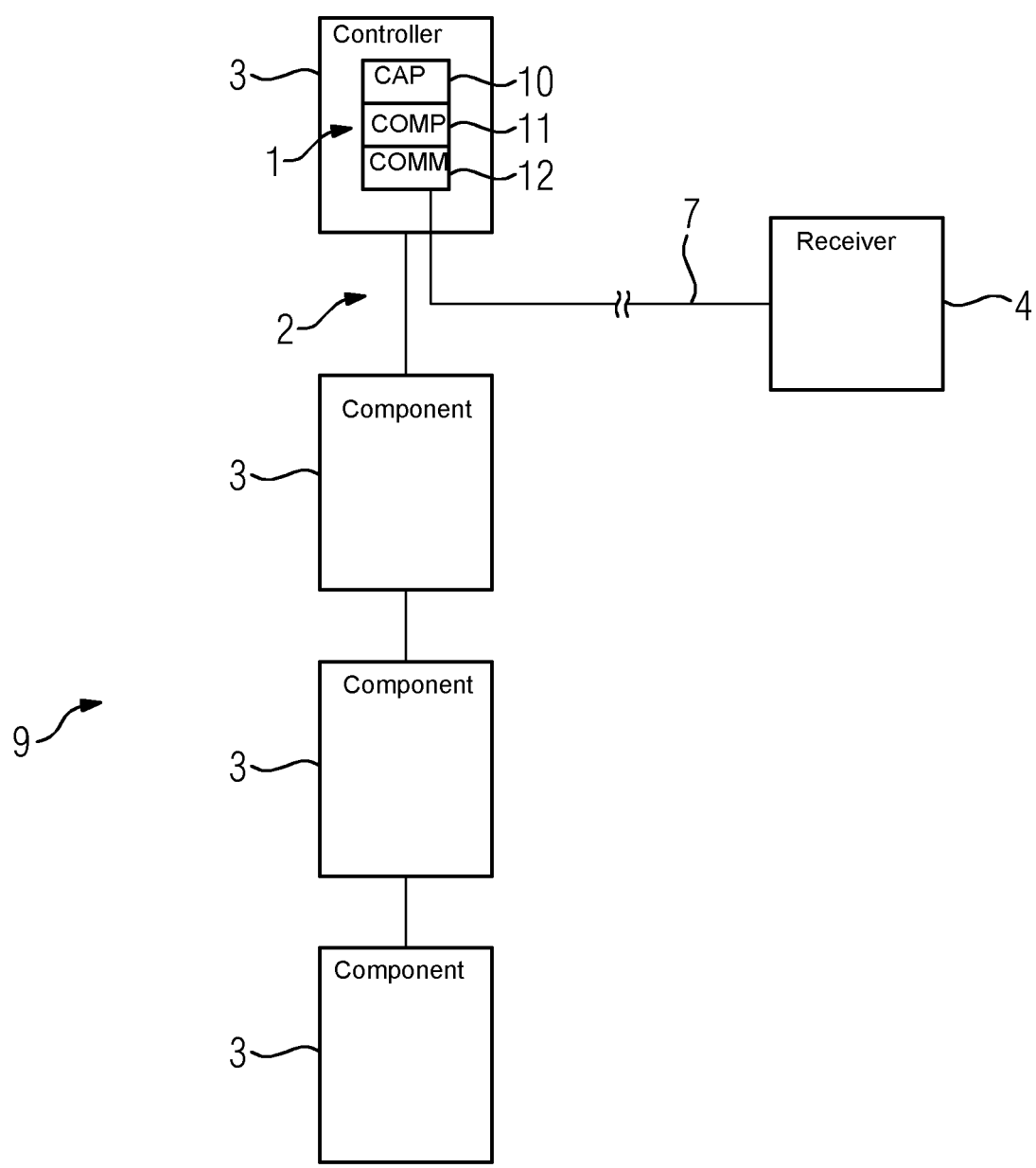
FIG. 1 shows a block diagram of one embodiment of a system for providing data packets from components that are connected by means of a CAN bus.

FIG. 1 shows a system 9 having a CAN bus 2, a control device 1 and a receiving device 4. The control device 1 is configured to capture data packets 5 from at least one component 3 of the CAN bus 2. To this end, the control device 1 has a capture unit 10 that is part of the CAN bus 2. In other words, the capture unit 10 is connected to the CAN bus 2.

The capture unit 10 captures the data packets 5 from the CAN bus 2. Next, the capture unit 10 provides the data packets 5 to a computing unit 11 of the control device 1. The computing unit 11 creates web resources 6 in which the data packets 5 are combined. Each of the web resources 6 forms a uniquely defined logical object that is callable from the receiving device (receiver) 4 by a communication unit (network interface) 12 via a data connection 7. In particular, each of the web resources 6 is callable by the receiving device 4 by a respective unique address. The address is in particular a URL (Uniform Resource Locator).

When the receiving device 4 requests one of the web resources 6 from the control device (controller) 1, the content of the requested web resource 6 is conveyed from the computing unit 11 to the receiving device 4 by the communication unit 12. The requested web resource 6 or the content thereof is conveyed via the data connection 7, in particular using a transmission protocol that is different than the CAN bus 2. In particular, the conveyance is effected by means of the HTTP (Hypertext Transfer Protocol) protocol or a CoAP (Constrained Application Protocol) protocol as the transmission protocol.

The receiving device 4 can be embodied as a personal computer, in particular as a laptop or desktop computer, as a server device or as a mobile terminal, for example as a smartphone or as a tablet computer. In the case of a receiving device 4 in the form of a server device, there can be provision for the server device to retrieve the web resources 6 regularly. In this way, a continual check on an operating state of the technical system by the server device is possible.

The CAN bus 2 connects multiple components 3 to one another. The components 3 are rendered able to exchange the data packets 5 by the CAN bus 2. In particular, each of the components 3 is designed to send and receive data packets 5 via the CAN bus 2. The CAN bus is embodied as per ISO standard 11898, in particular. In the present case, the control device 1 is part of one of the components 3. In other embodiments, the control device can be connected to the CAN bus 2 independently of the components 3 of the CAN bus 2. The components 3 and the CAN bus 2 can be part of a charging station for a motor vehicle, in particular an electric vehicle. The components 3 of the CAN bus can then be formed by different modules of the charging station. By way of example, one of the components 3 is embodied as a converter, an operator control unit, a communication unit for the communication between the motor vehicle and an energy meter, and an energy meter in each case. The charging station is an actual example of a technical system. In general, the components 3 and the CAN bus 2 can accordingly be part of any technical system. In general, the components 3 form modules of the technical system that are able to communicate with one another by means of the CAN bus 2.

In order to allow remote maintenance of the technical system, the charging station, the CAN bus 2 and/or one of the components 3, there is provision for the control device 1 to allow the provision of the data packets 5 via the data connection 7. The data connection 7 can be provided for example via the Internet, a mobile radio module, Ethernet or any other data connection allowing a long range. By contrast, the CAN bus 2 is designed only for local transmission of the data packets 5 within the technical system. Routing the data packets 5 out of the CAN bus 2 to allow the remote maintenance is therefore not readily possible.

Figure 2:
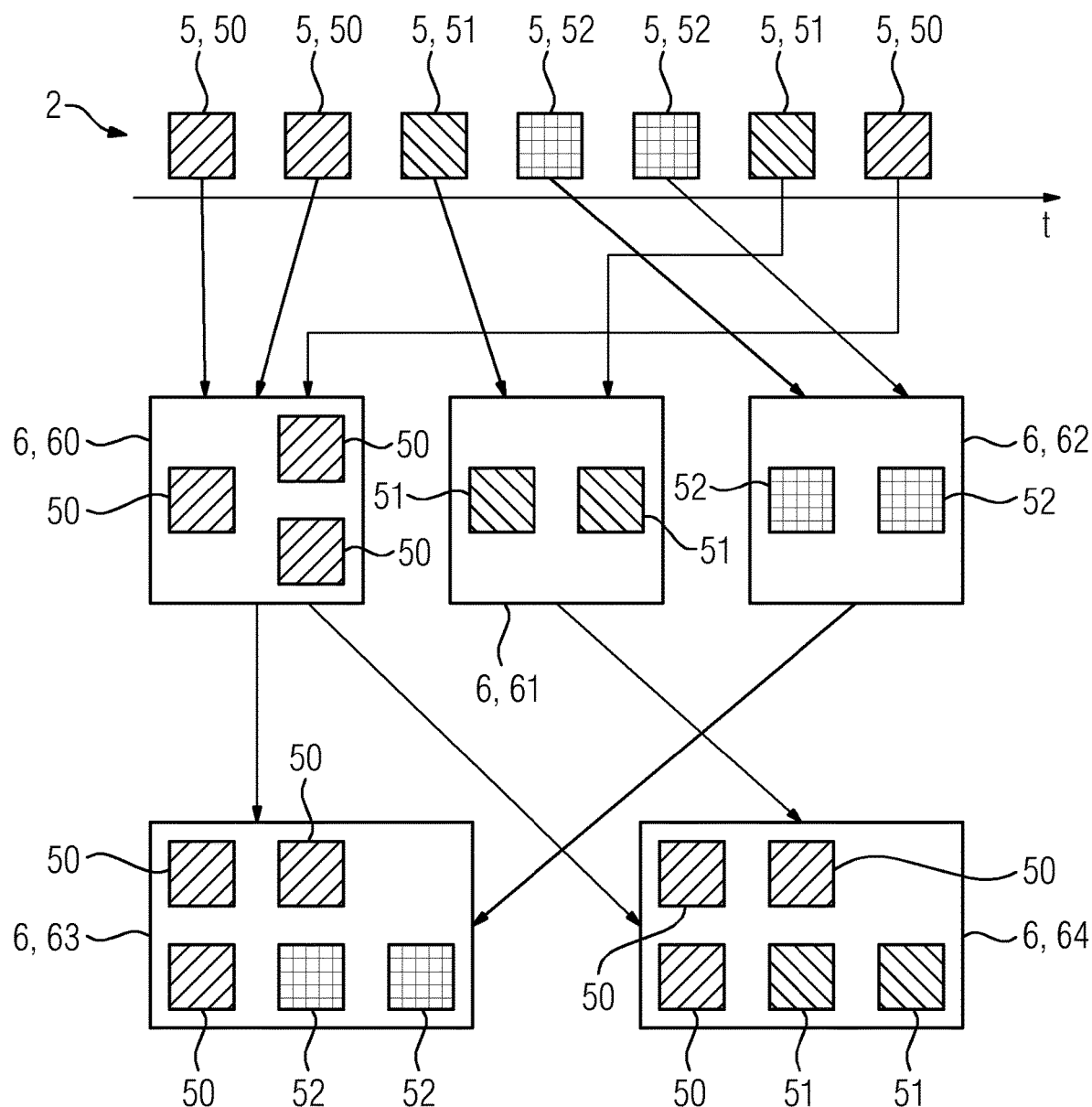
FIG. 2 shows an example of the distribution of the data packets over multiple web resources.

FIG. 2 shows a time characteristic along a time axis t for the data packets 5 sent via the CAN bus 2. In the present example, a distinction is drawn between three different types of data packets 50, 51, 52. By way of example, the data packets 50, 51, 52 each have different identifiers, what are known as CAN IDs. A predetermined specification stipulates that data packets 50, 51, 52 having the same identifier are combined in a respective web resource 60, 61, 62 in each case. FIG. 2 shows that the data packets 50 are combined in the web resource 60, the data packets 51 are combined in the web resource 61, and the data packets 52 are combined in the web resource 62. By way of example, the data packets 50 are ready signals of a first of the components 3. By way of example, the data packets 62 are ready signals of a second of the components 3. By way of example, the data packets 51 are payload data of the first of the components 3. In other words, the data packets 50 and the data packets 51 are received from the same instance of the components 3. The data packets 50 and the data packets 52 in the present case are data packets 5 of the same information type, in the present case ready signals. In other words, the information type of the data packets 50, 52 is that of a ready signal. The ready signal can also be referred to as a "Heartbeat" and can be sent by one of the components 3 at regular or periodic intervals in order to indicate the readiness of the component 3 for use.

The data packets 50, 51, 52 are combined in the web resources 60, 61, 62 raw. In this context, raw means that the content of the data packets 50, 51, 52 is not interpreted for distributing the data packets 50, 51, 52 over the web resources 60, 61, 62. The data packets 50, 51, 52 are split over the web resources 60, 61, 62 solely on the basis of the identifier of said data packets, in particular their CAN-ID. In the actual example, the data packets 50 carry a first identifier, the data packets 51 carry a second identifier and the data packets 52 carry a third identifier. The predetermined specification stipulates that all data packets 50 that carry the first identifier are combined in the web resource 60. The predetermined specification stipulates that all data packets 51 that carry the second identifier are combined in the web resource 61. In accordance with the predetermined specification, all data packets 52 that carry the third identifier are combined in the web resource 62. The receiving device 4 is therefore able to retrieve the data packets 5 in a manner sorted according to their identifier.

The data packets 5 are combined in the web resources 63, 64 in interpreted form. This requires the data packets 5 to be interpreted first. By way of example, a content of the data packets 5 is interpreted. Alternatively or additionally, the respective information type of the data packets 5 can be interpreted. In the present example, the data packets 50 and the data packets 52 are combined in the web resource 63, since the data packets 50 and the data packets 52 have the same information type, namely that of a ready signal. The data packets 50 and the data packets 51 are combined in the web resource 64, since both the data packets 50 and the data packets 51 are received from the same instance of the components 3.

As depicted by the time axis t, the data packets 5 are received via the CAN bus 2 in succession. However, the data packets 5 are stored in the web resources 6 permanently or for a predetermined period of time. In order to make allowance for the time characteristic of the data packets 5 on the CAN bus 2 in the web resources 6 too, there can be provision for each of the data packets 5 to be assigned a timestamp on storage in the web resource 6. In other words, the data packets 5 are stored in the web resource 6 together with a virtual timestamp. The virtual timestamp can indicate the time at which the respective data packet 5 was received from the CAN bus 2.

To improve the interpretation of the data packets 5, there can be provision for the control device 1 or the communication unit 12 to be designed to receive a program module from the receiving device 4. The program module can for example prescribe the way in which the data packets 5 need to be interpreted. In the present case, the program module prescribes that the data packets 50 having the first identifier and the data packets 52 having the third identifier each need to be interpreted as ready signals. Additionally, in the present case, the program module prescribes that the data packets 50 having the first identifier and the data packets 51 having the second identifier each come from the first of the components 3. In other words, the present program module prescribes how the data packets 5 need to be interpreted on the basis of their identifier.

Since all data packets 5 are mapped onto the web resources 6 by the CAN bus 2, access monitoring for the data packets 5 can be ensured. By way of example, only those instances of the data packets 5 to which a user of the receiving device 4 is supposed to be provided with access are mapped onto the web resources 6. This allows access monitoring or fine-grained granting of access to individual physical components, the components 3, or within a prescribed time window. A fundamental aspect in this case is that the mapping or combination of the data packets 5 in the web resources 6 is effected automatically.

The program modules allow targeted evaluation and adaptable interpretation of the data packets 5. In this way, data packets 5 can be interpreted or rendered in a manner that relates to the respective instance of application. By way of example, manufacturers of some of the components 3, a maintenance company for the technical system and a manufacturer of the technical system can each store or install program modules of their own on the control device 1.

A further feature is the statelessness of access to the data packets 5 via the web resources 6. This allows a connection via the data connection 7 to the control device 1 at any time. Requests for web resources or data packets 5 can be made at any time without being dependent on the result of a previous request. Therefore, the demands on the reliability of the data connection are particularly low. In particular, the demands on the reliability of the connection are lower than in the case of an SSH connection, for example.

In particular, the receiving device 4 is unable to access the CAN bus 2 and/or the computing unit 11 beyond retrieving the web resource 6. Alternatively, the receiving device 4 is unable to access the computing unit 11 and/or the CAN bus 2 beyond retrieving the web resources 6 and providing the program module. In other words, the control device allows exclusively retrieval of the web resources 6 and optionally provision of the program module and blocks all access beyond that. In this way, the computing unit 11 or the CAN bus 2 and also the technical system can be protected from unauthorized access. Alternatively or additionally, the CAN bus 2, the technical system and/or the control device 1 can be protected by security mechanisms that are standard on the Internet. Examples of these are TLS (Transport Layer Security) certificates or tokens.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for providing data packets from a CAN bus, the method having the acts of:
   capturing the data packets from at least one component of the CAN bus by a capture unit that is part of the CAN bus,
   creating multiple web resources, which contain the data packets, according to a predetermined specification by a processor, wherein only data packets that are related according to the predetermined specification are combined in the web resources, each of the multiple web resources having a respective, unique address,
   conveying a content of the web resources from the processor to a receiving device via a data connection, using a transmission protocol that is different than the CAN bus, by a communication unit.

2. The method as claimed in claim 1, characterized in that the content of the web resources is conveyed to the receiving device with an HTTP (Hypertext Transfer Protocol) protocol or a CoAP (Constrained Application Protocol) protocol as the transmission protocol.

3. The method as claimed in claim 1, characterized in that the predetermined specification stipulates that the creating of the web resources results in a content of the data packets being interpreted, and the content is used to ascertain whether the data packets are related.

4. The method as claimed in claim 1, characterized in that the predetermined specification is provided at least in part by a program module that is received from the receiving device.

5. The method as claimed in claim 4, characterized in that the processor, configured by the receiving of the program module, interprets the data packets in a manner adapted to the receiving device, to an instance of application and/or to the at least one component of the CAN bus.

6. The method as claimed in claim 1, characterized in that the content of the web resources is conveyed to the receiving device without granting the receiving device access to the processor and/or the CAN bus beyond the conveyance.

7. The method as claimed in claim 1, characterized in that only such data packets as the receiving device has the authorization to receive are combined in the web resources.

8. The method as claimed in claim 1, characterized in that the data packets comprise a respective identifier and the predetermined specification stipulates that such data packets having the same identifier are combined in the web resources.

9. The method as claimed in claim 1, characterized in that the data packets have a respective information type, and the predetermined specification stipulates that data packets of the same information type and/or of the ready signal are combined in the web resources.

10. A controller for providing data packets from a CAN bus of a charging station for a motor vehicle, the controller comprising;
    a capture interface, which is connectable to the CAN bus, configured to capture the data packets from at least one component of the CAN bus,
    a processor configured to create multiple web resources, which contain the data packets, according to a predetermined specification, wherein only data packets that are related according to the predetermined specification are combined in the web resources, each of the web resources having a respective, unique address,
    a communicator configured to convey a content of the web resources from the processor to a receiving device via a data connection, using a transmission protocol that is different than the CAN bus.

11. A system for providing data packets, the system comprising:
    a controller comprising a capture interface, which is connectable to a CAN bus, configured to capture the data packets from at least one component of the CAN bus, a processor configured to create multiple web resources, which contain the data packets, according to a predetermined specification, wherein only data packets that are related according to the predetermined specification are combined in the web resource, each of the web resources having a respective, unique address, and a communicator configured to convey a content of the web resources from the processor to a receiving device via a data connection, using a transmission protocol that is different than the CAN bus, the CAN bus having a component that is configured to convey the data packets to the controller, and a receiving device for retrieving the web resources from the control device.

12. The method as claimed in claim 1, characterized in that capturing comprises capturing the data packets from the at least one component, the at least one component of the CAN bus being in a charging station for a motor vehicle.

13. The method as claimed in claim 9, characterized in that the information type of the data packets comprises a ready signal.

14. The method as claimed in claim 2, characterized in that the predetermined specification stipulates that the creating of the web resources results in a content of the data packets being interpreted, and the content is used to ascertain whether the data packets are related.

15. The method as claimed in claim 14, characterized in that the predetermined specification is provided at least in part by a program module that is received from the receiving device.

16. The method as claimed in claim 15, characterized in that the processor, configured by the receiving of the program module, interprets the data packets in a manner adapted to the receiving device, to an instance of application and/or to the at least one component of the CAN bus.

17. The method as claimed in claim 16, characterized in that the content of the web resources is conveyed to the receiving device without granting the receiving device access to the processor and/or the CAN bus beyond the conveyance.

18. The method as claimed in claim 17, characterized in that only such data packets as the receiving device has the authorization to receive are combined in the web resources.

19. The method as claimed in claim 18, characterized in that the data packets comprise a respective identifier and the predetermined specification stipulates that such data packets having the same identifier are combined in the web resources.

20. The method as claimed in claim 19, characterized in that the data packets have a respective information type, and the predetermined specification stipulates that data packets of the same information type and/or of the ready signal are combined in the web resources.

* * * * *